Aug. 3, 1965  J. W. HASKELL  3,198,985
ELECTRONIC CRUISE CONTROL SYSTEM FOR MOTOR VEHICLES
Filed April 11, 1960  2 Sheets-Sheet 1

INVENTOR.
John W. Haskell
BY
W. E. Finch
His Attorney

INVENTOR.
John W. Haskell
BY
His Attorney

United States Patent Office 3,198,985
Patented Aug. 3, 1965

---

3,198,985
ELECTRONIC CRUISE CONTROL SYSTEM FOR MOTOR VEHICLES
John W. Haskell, Vestal, N.Y., assignor to General Motors Corporation, Detroit, Mich., a corporation of Delaware
Filed Apr. 11, 1960, Ser. No. 21,478
5 Claims. (Cl. 317—5)

This invention pertains to speed control systems for motor vehicles, and particularly to an electronic control system for maintaining vehicle speed substantially constant at any one of a plurality of manually selected speed levels.

At the present time there are several automatic speed, or cruise, control systems available for use on motor vehicles. The available systems are mechanical in nature, and accordingly must be located within the vehicle contiguous to the speed indicating and speed controlling means thereof. This invention relates to an electronic speed, or cruise, control system which can be placed in any convenient location in the vehicle. Accordingly, among my objects are the provision of an electronic cruise control system including means for comparing a voltage proportional to speed with a reference voltage having an amplitude determined by the selected speed level to be maintained; the further provision of an electronic cruise control system specifically adapted for use with an electric speedometer drive; and the still further provision of an electronic cruise control system including electronic means for controlling vehicle speed through a mechanical actuating system.

The aforementioned and other objects are accomplished in the present invention by comparing a voltage proportional to vehicle speed with a voltage proportional to the selected speed level and obtaining an output dependent upon the difference between the two voltages for controlling the fuel input to the vehicle engine. Specifically, the electronic cruise control system is designed for use with an electric speedometer drive of the type disclosed in copending application Serial No. 857,012 filed Dec. 3, 1959, in the name of William E. Fritz et al. and assigned to the assignee of this invention, now Patent Number 3,108,216. The electric speedometer drive includes a Selsyn-type transmitter for developing a three phase alternating current signal having a frequency proportional to vehicle speed. The selsyn receiver is energized by the three phase speed signal and constitutes the drive for a conventional speedometer. The speed signal for the electronic cruise control is derived from the windings of the selsyn receiver and thus has a frequency directly proportional to vehicle speed. In order to develop a voltage proportional to the frequency of the transmitter signal, or to vehicle speed, the three phase signal is differentiated, rectified and filtered to provide a direct current output voltage proportional to vehicle speed.

The voltage having an amplitude proportional to vehicle speed, or the speed signal voltage, is compared with a reference voltage derived from a voltage divider calibrated in miles per hour. The voltage difference has one polarity when vehicle speed is less than the selected speed level and an opposite polarity when vehicle speed is greater than the selected speed level. The difference voltage from the voltage comparator is coupled to the input stage of a transistor amplifier through a forward connecting diode. Accordingly, when the difference voltage has a negative polarity, it has no effect on the transistor amplifier, while when the difference voltage has a positive polarity it functions to cut off the transistor amplifier.

The transistor amplifier includes three stages which are direct coupled and operate in a closed loop. The amplifier output is used to energize a solenoid coil for operating an air valve. The air valve in turn controls the operation of a vacuum motor connected to the throttle valve of the vehicle engine. The throttle valve in turn controls engine speed and ultimately vehicle speed, and since the transmitter of the electric speedometer drive is driven at a speed proportional to vehicle speed the entire system operates in a closed loop. When the transistor amplifier is conducting, the engine throttle valve is maintained substantially wide open. On the other hand, when the transistor amplifier is cut off the throttle valve of the engine is moved substantially to the fully closed position.

Further objects and advantages of the present invention will be apparent from the following description, reference being had to the accompanying drawings, wherein a preferred embodiment of the present invention is clearly shown.

Figure 1:
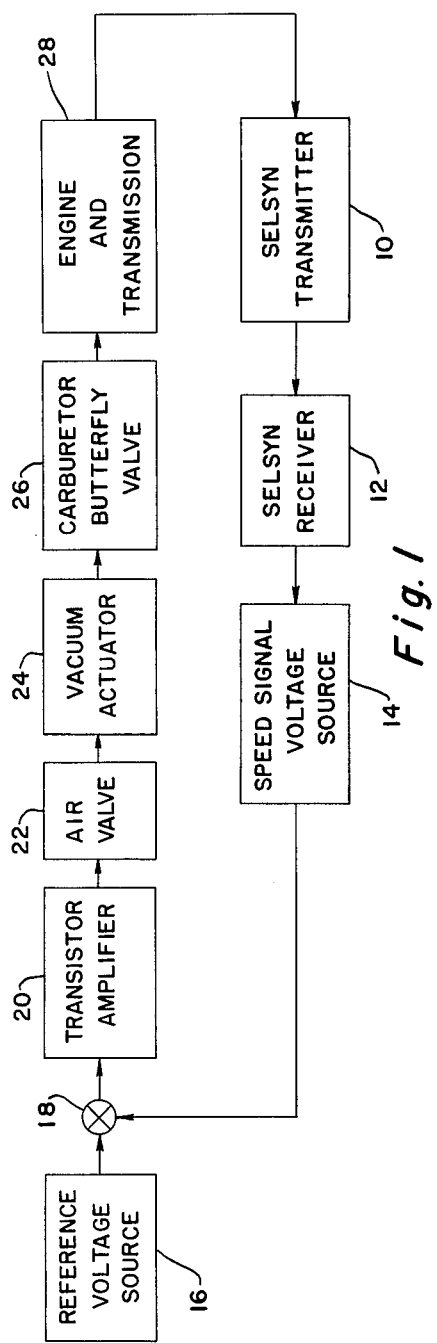
FIGURE 1 is a block diagram of the cruise control system.

With particular reference to FIGURE 1, a block diagram of the electronic cruise control for a motor vehicle is shown including an electric speedometer drive comprising a selsyn transmitter 10 and a selsyn receiver 12. A speed signal having a frequency proportional to vehicle speed is derived from the selsyn transmitter and converted to a direct current signal having an amplitude proportional to vehicle speed, which signal constitutes the speed signal voltage source 14 that is compared with a reference voltage source 16 in a comparator 18. Since the control system is of the feedback type, the control function is performed by comparing the controlled quantity, namely the speed signal voltage with a reference quantity, namely a voltage proportional to the selected speed level to be maintained, and obtaining the difference between the two voltages to actuate the system so that the difference value in the voltages will be minimized. The voltage difference controls a transistor amplifier 20, the output of which is used to energize a solenoid air valve 22 for controlling a vacuum actuator 24. The vacuum actuator 24 in turn controls the throttle valve 26 of the vehicle engine, and the selsyn transmitter is driven at a speed proportional to vehicle speed from the transmission 28. As is apparent from an inspection of FIGURE 1, the entire cruise control system operates in a closed loop.

Figure 3:
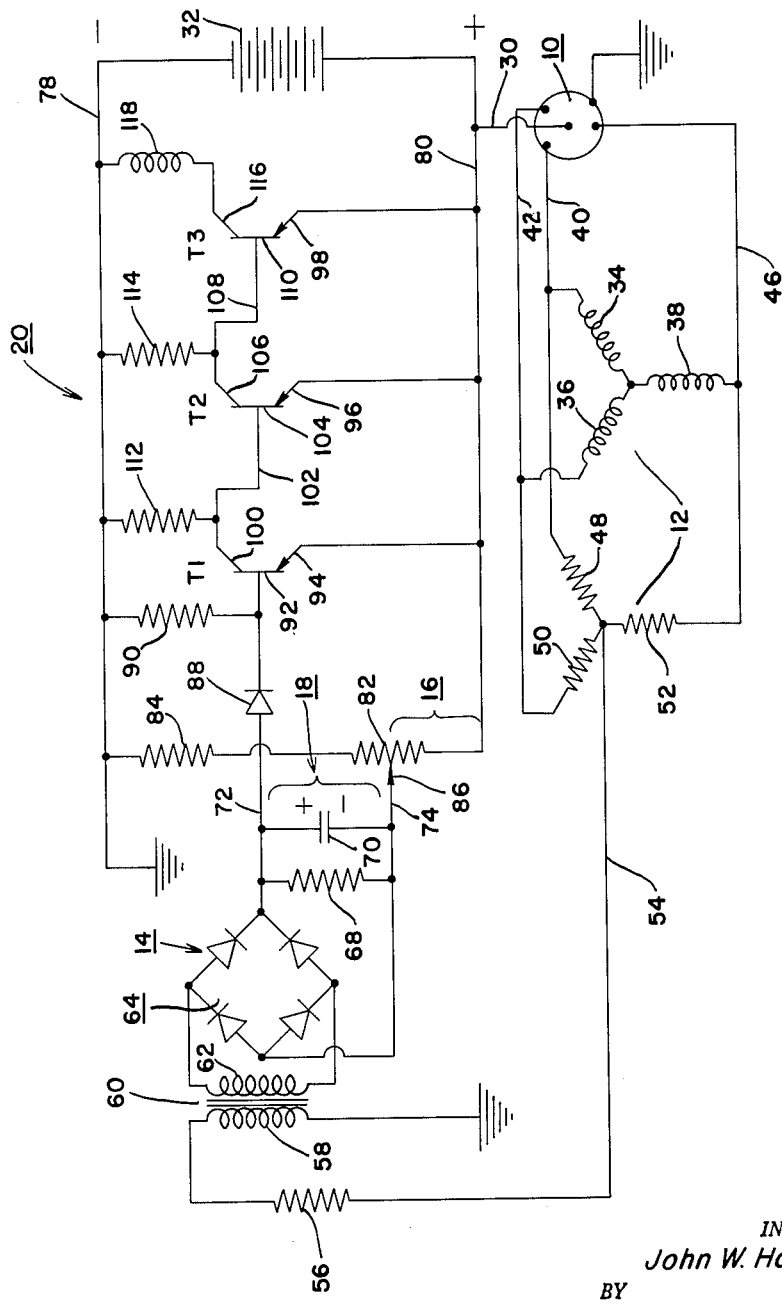
FIGURE 3 is a schematic diagram of the electric speedometer drive, the voltage comparator and the transistor amplifier.

With reference to FIGURE 3, a schematic diagram of the selsyn receiver 12, the speed signal source 14, the reference voltage source 16, the voltage comparator 18 and the transistor amplifier 20 will be described in detail. The selsyn transmitter 10 which is driven at a speed proportional to vehicle speed is energized through wire 30 from the vehicle battery 32. The three phase alternating current signal produced by the transmitter 10 is supplied to the windings 34, 36 and 38 of the selsyn receiver 12 through wires 40, 42 and 46, respectively. The coils 34, 36 and 38 of the selsyn receiver are shunted by damping resistors 48, 50 and 52, respectively, which are connected in Y connected receiver windings. The speed signal for the electronic cruise control is developed between the common junction of resistors 48, 50 and 52 and ground, which signal has a frequency component three times the rotational speed of the transmitter 10.

The common junction of resistors 48, 50 and 52 is connected by a wire 54 through a calibrating resistor 56, and a primary winding 58 of a transformer 60 to ground.

The transformer 60 has a secondary winding 62 in which a signal is induced proportional to the frequency of the signal developed across the resistors 48, 50 and 52. The secondary winding 62 of the transformer 60 is connected to a full wave bridge type rectifier 64. The rectified output voltage is developed across resistor 68 and filtered by a condenser 70 to provide a direct current potential between wires 72 and 74 having an amplitude proportional to the frequency of the signal developed across the resistors 48, 50 and 52. The trnsformer 60 functions to differentiate the three phase signal developed across resistors 48, 50 and 52, that is, the main component of the transformer output comprises voltage spikes proportional to the time derivative of the original three phase speed signal induced by the inductive load of the transformer.

Figure 2:
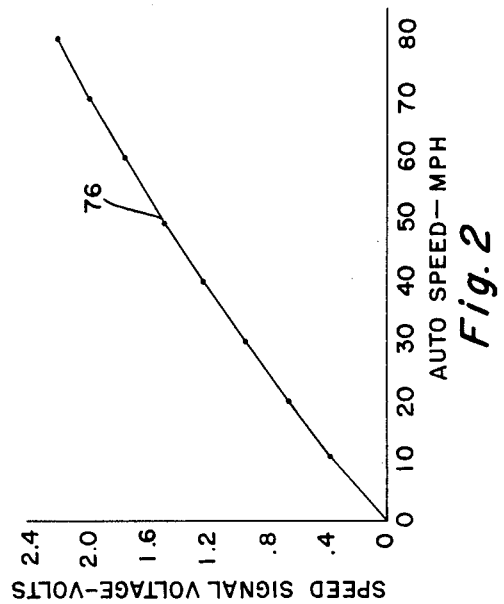
FIGURE 2 is a graph depicting the relationship between the amplitude of the speed signal voltage and vehicle speed.

With reference to the graph in FIGURE 2, the curve 76 indicates the variations in voltage between wires 72 and 74 with respect to vehicle speed in miles per hour. Variations in the output voltage between wires 72 and 74 due to the characteristics of the transformer 60, the load on the rectifier 64 and the inductive load of the selsyn receiver 12 will be compensated for by the calibrating resistor 56 in series with the primary winding 58.

The voltage supply for the transmitter 10, namely the battery 32, is connected by wires 78 and 80 to a voltage divider including a potentiometer 82 and a resistor 84. Since variations in the terminal voltage of the battery 32 affect the amplitude of the speed signal voltage between wires 72 and 74, the reference voltage for the comparator is derived from the same voltage source whereby the effects of variations in the supply of voltage have no effect on the operation of the system. The potentiometer 82 of the voltage divider network includes a manually movable slider 86 connected to the wire 74. The potentiometer 82 may be conveniently calibrated in miles per hour, and constitutes the means for selecting the desired speed level. The voltage developed between the slider 86 and the wire 80 constitutes the reference voltage, which is compared with the voltage signal between wire 72 and wire 74. The voltage comparator comprises the lower portion of the potentiometer 82 between the slider 86 and the wire 80, the wire 74, the resistor 68 and the wire 72.

When the amplitude of the reference voltage between the slider 86 and the wire 80 is greater than the amplitude of the voltage betwen the wires 72 and 74, the difference voltage appearing at wire 72 is negative. The wire 72 is connected to a forward conducting diode 88 and a resistor 90 to ground. When the difference voltage is such that wire 72 is negative, the diode 88 will block this signal from the base 92 of the first stage transistor T1.

The transistor amplifier 22 comprises three direct coupled transistors T1, T2 and T3 of the PNP type. The emitter electrodes 94, 96 and 98 of the transistors T1, T2 and T3 are connected to wire 80. The collector electrode 100 of transistor T1 is connected by wire 102 to the base 104 of transistor T2, and the collector electrode 106 of transistor T2 is connected by wire 108 to the base electrode 110 of transistor T3. In addition, the collector electrodes 100 and 106 of transistors T1 and T2 are connected to ground through resistors 112 and 114, respectively. The collector electrode 116 of transistor T3 is connected to ground through a solenoid winding 118 for the air valve 22.

When the diode 88 is not conducting current, the transistor T1 is saturated, or conducting, and thus the output signal derived from the collector 100 biases the transistor T2 to cut off. With the transistor T2 biased to cut-off, the transistor T3 is saturated, or conducting, thereby energizing the solenoid coil 118. These conditions prevail as long as the amplitude of the speed signal voltage between wire 72 and 74 is less than the amplitude of the reference signal voltage derived by the slider 86 and the wire 80 which indicates that the vehicle speed is less than the selected speed level. Therefore, the solenoid 118 closes the air valve enabling the vacuum actuator 24 to maintain the throttle valve 26 fully open. When the vehicle speed reaches the selected speed level, the speed signal voltage between wire 72 and 74 will have an amplitude substantially equal to the amplitude of the reference signal voltage between slider 86 and the wire 80. However, the diode 88 will still be non-conductive so that the throttle valve will remain wide open.

When vehicle speed exceeds the selected speed level, the speed signal voltage between wires 72 and 74 will have an amplitude greater than the reference voltage signal between the slider 86 and the wire 80, whereupon the diode 88 will conduct current thereby diverting base current from the transistor T1 so as to bias the transistor T1 to cutoff. When transistor T1 is biased to cutoff, the transistor T2 will be saturated, or conducting, and thus bias transistor T3 to cutoff. Accordingly, the solenoid winding 118 will be deenergized thereby opening the air valve 22 so as to inactivate the vacuum actuator 24 and cause closure of the throttle valve 26. In this manner the vehicle speed is maintained substantially at the selected speed level determined by the position of the potentiometer slider 86 which, as aforementioned, is calibrated in miles per hour.

While the embodiment of the invention as herein disclosed constitutes a preferred form, it is to be understood that other forms might be adopted.

What is claimed is as follows:

1. A speed regulating system for a motor vehicle including, a direct current source, means developing an alternating current signal from said direct current source having a frequency proportional to vehicle speed, differentiating means for said alternating current speed signal, rectifying means having an input comprising said differentiated speed signal and an output comprising a direct current signal having a voltage proportional to vehicle speed, means deriving a source of direct current reference voltage from said direct current source, manual means for adjusting said reference voltage to select the desired speed level, means comparing the reference voltage and the speed signal voltage for obtaining a difference voltage, an amplifier responsive to said difference voltage, and vehicle speed control means actuated by the output of said amplifier for maintaining vehicle speed substantially constant at the manually preselected speed level.

2. A speed control system for a motor vehicle including, a direct current source, means developing an alternating current signal from said direct current source having a frequency proportional to vehicle speed, a differentiating transformer energized by said alternating current signal having an output proportional to the frequency thereof, rectifying means connected with said transformer for producing a direct current signal having a voltage proportional to vehicle speed, means deriving a reference speed signal source from said direct current source having a voltage proportional to the selected vehicle speed, and means for comparing the amplitude of the speed signal voltage with the amplitude of the reference signal voltage to obtain a difference output for controlling the speed of said motor vehicle.

3. A speed control system for a motor vehicle including, a source of direct current, an adjustable reference voltage proportional to the selected speed level derived from said direct current source, means deriving a direct current signal having a voltage proportional to actual vehicle speed from said direct current source, a resistive network for comparing the reference signal voltage and the actual speed signal voltage to obtain a difference voltage proportional to the difference between actual vehicle speed and selected vehicle speed, a transistor amplifier controlled by said difference voltage and having an output for regulating the speed of said vehicle, and a forward conducting diode connected between said resistive network and said transistor amplifier for controlling the operation of said amplifier in accordance with the polarity of said difference voltage.

4. A speed control system for a motor vehicle including, a source of direct current, a voltage divider network connected across said direct current source including a potentiometer having an adjustable slider, manual means for adjusting said slider to obtain a reference voltage proportional to the selected speed level, means developing an alternating current signal from said direct current source having a frequency proportional to actual vehicle speed, differentiating means for said alternating current signal, rectifying means connected to said differentiating means for producing a direct current signal having a voltage proportional to actual vehicle speed, means comparing the reference voltage signal and the actual speed signal voltage to obtain a difference voltage between actual vehicle speed and the selected vehicle speed, and means controlled by said difference voltage for regulating the speed of said vehicle.

5. A speed control system for a motor vehicle including, a source of direct current, a voltage divider network connected across said direct current source including a potentiometer having an adjustable slider, manual means for adjusting said slider to obtain a reference voltage proportional to the selected speed level, means deriving a direct current signal from said direct current source having a voltage proportional to actual vehicle speed, means comparing the reference voltage signal and the actual speed signal voltage to obtain a difference voltage between actual vehicle speed and selected vehicle speed, a transistor amplifier controlled by said difference voltage and having an output for regulating the speed of said vehicle, and a forward conducting diode connected between said signal comparing means and said transistor amplifier for controlling the operation of said transistor amplifier in accordance with the polarity of said difference voltage.

References Cited by the Examiner

UNITED STATES PATENTS

| 2,768,331 | 10/56 | Cetrone | 317—5 |
| 2,772,378 | 11/56 | Farkas | 317—5 |
| 2,809,339 | 10/57 | Guggi | 318—327 |
| 2,829,662 | 4/58 | Carey | 317—5 X |
| 2,919,384 | 12/59 | Guarino et al. | 317—5 |
| 2,941,120 | 6/60 | Harmon et al. | 317—5 |
| 2,946,925 | 7/60 | May | 317—5 |
| 2,960,629 | 11/60 | Oldenburger | 317—5 |
| 2,980,369 | 4/61 | Ruof | 317—5 |
| 2,992,382 | 7/61 | Hetzler et al. | 317—5 |

SAMUEL BERNSTEIN, *Primary Examiner.*